United States Patent [19]
Perin

[11] Patent Number: 5,913,560
[45] Date of Patent: Jun. 22, 1999

[54] SUPPLEMENTAL SUN SHIELD ASSEMBLY FOR A VEHICLE AND METHOD FOR PROVIDING AND DEPLOYING A SUN VISOR SUPPLEMENTING SUN SHIELD

[75] Inventor: Douglas E. Perin, West Liberty, Ohio

[73] Assignee: Honda Giken Kogyo Kabushiki Kaisha, Tokyo, Japan

[21] Appl. No.: 09/001,054

[22] Filed: Dec. 30, 1997

[51] Int. Cl.⁶ ........................................ B60J 3/50
[52] U.S. Cl. ............................................. 296/97.6
[58] Field of Search ................................. 296/97.6

[56] References Cited

U.S. PATENT DOCUMENTS

| | | | |
|---|---|---|---|
| 4,275,917 | 6/1981 | Marcus | 296/97.6 |
| 4,940,273 | 7/1990 | Konishi | 296/97.6 |
| 4,958,879 | 9/1990 | Gillum | 296/97.6 |
| 4,974,896 | 12/1990 | Konishi | 296/97.6 |
| 5,622,401 | 4/1997 | Ip | 296/97.6 |
| 5,626,381 | 5/1997 | Gervasoni et al. | 296/97.6 |

*Primary Examiner*—Gary C. Hoge
*Attorney, Agent, or Firm*—Lahive & Cockfield, LLP

[57] ABSTRACT

A supplemental, sun visor manipulated sun shield concept which provides a barrier to the passage of sun through a sunlight exposure zone provided by a sun visor and which may be a) adjacent to a mounting detent carried by the sun visor and/or b) adjacent to the sun visor and located between the vehicle headliner and a rear view mirror and method of operation and deployment of this supplemental sun shield.

27 Claims, 3 Drawing Sheets

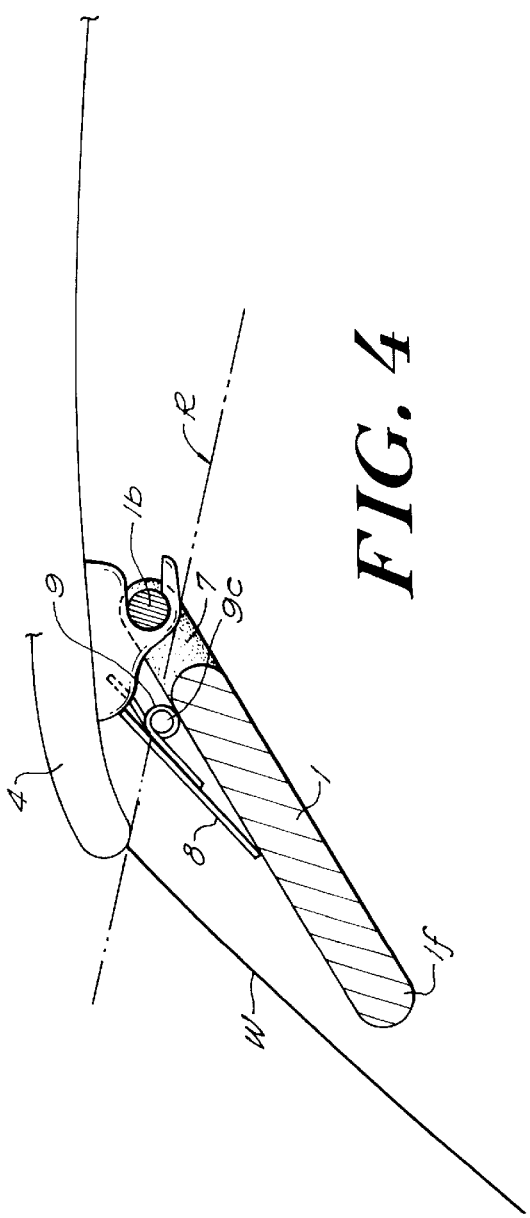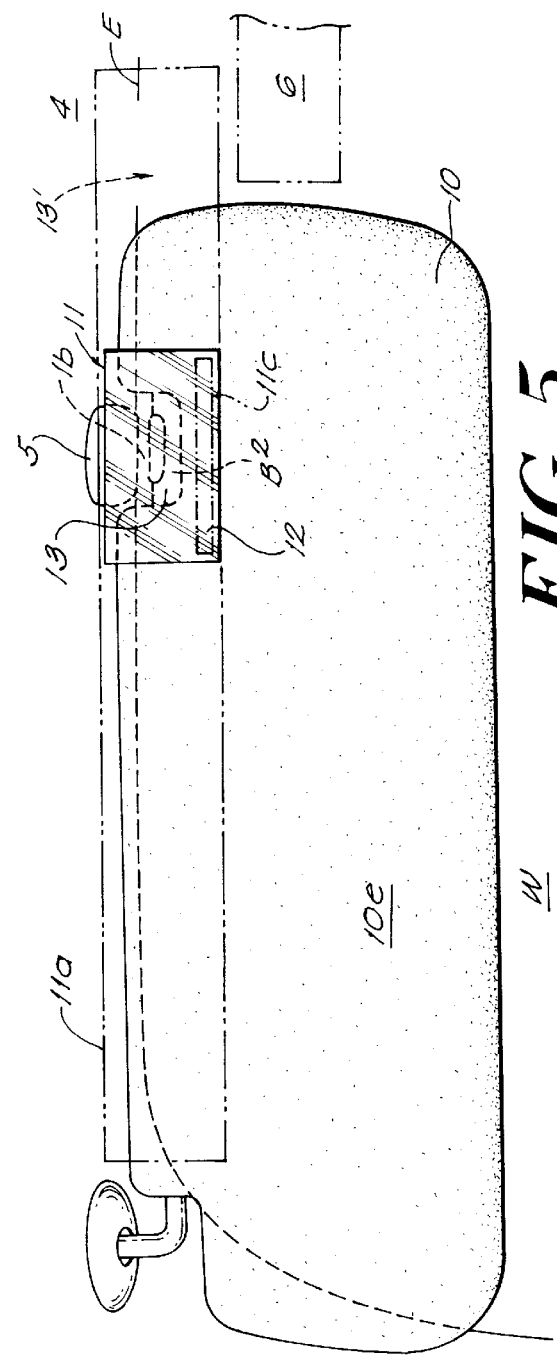

SUPPLEMENTAL SUN SHIELD ASSEMBLY FOR A VEHICLE AND METHOD FOR PROVIDING AND DEPLOYING A SUN VISOR SUPPLEMENTING SUN SHIELD

This invention is directed toward an improved sun visor design and is implemented through the provision of a supplemental sun shield which cooperates with a sun visor to provide enhanced sun screening between a sun visor area and the area defined by a vehicle headliner and windshield.

In particular, the invention is directed to blocking annoying sun rays which would otherwise be transmitted through a sunlight exposure zone adjacent to a securing detent of a sun visor, which detent serves to pivotably secure the sun visor to the vehicle beneath the elevation of the headliner. The invention also contemplates a sun visor manipulated sun shield which serves to block sun rays in the area adjacent the sun visor and between the vehicle headliner and a rear view mirror.

GENERAL BACKGROUND OF THE INVENTION

This invention is concerned basically with a supplemental sun shield which provides a barrier to the passage of sun rays in the area between the sun visor and a peripheral portion of the vehicle defined by the headliner and windshield.

Specifically, the invention is focused upon the provision of a sun visor manipulated, supplemental sun shield which effectively blocks sun rays from being transmitted through the windshield and through a sun light exposure zone which may be adjacent to a mounting detent incorporated in the sun visor and/or adjacent the sun visor and between the headliner and a rear view mirror.

The invention entails two approaches or embodiments.

One embodiment entails a resiliently biased supplemental shield which is resiliently biased toward the sun visor so as to continuously afford supplemental sun shielding action, which is automatically optimally positioned, and which does not interfere with the normal operation of the sun visor.

A second approach entails the utilization of a supplemental sun shield which is detachably secured to a face of the sun visor and which may be configured so as to simply block the passage of sun rays through the sun exposure zone. This shield may be configured so as to extend longitudinally along substantially the entire length of the sun visor and possibly project above the sun visor and away from the edge of the sun visor toward the mirror so as to provide supplemental sun screening action above the sun visor and in the area between the sun visor and the mirror.

While the prior art has recognized the value of certain types of supplemental sun shields, the present invention has not been heretofore suggested.

For example, supplemental sun shields which are intended to relieve glare in the area over the rear view mirror and between visors—but which do not contemplate the principal focus of the present invention—are exemplified by the following prior art disclosures.

| Country | Patent Number | Inventor | Assignee |
|---|---|---|---|
| U.S. | 4,275,917 | Marcus | Prince Corporation |
| U.S. | 4,363,512 | Marcus | Prince Corporation |
| U.S. | 4,940,512 | Konishi | Nissan Motor Co., Ltd. |
| U.S. | 4,974,896 | Konishi | Nissan Motor Co., Ltd. |
| Japan | 57-131321 | | |

Additional prior art disclosures which are generally reflective of the state of the art in this area include:

| Country | U.S. Pat. No. | Inventor | Assignee |
|---|---|---|---|
| U.S. | 2,673,118 | H. I. Phelps | |
| U.S. | 3,545,805 | Wilson | |
| U.S. | 4,053,180 | White | |
| U.S. | 4,982,992 | Vu et al | |
| U.S. | 5,064,238 | Mohtasham | |
| U.S. | 5,165,748 | O'Connor | |
| U.S. | 5,611,591 | Van Devender | |
| U.S. | 5,613,725 | Lozano | |
| U.S. | 5,626,381 | Gervasoni et al | Gebr. Happich GmbH |

Having described the general background of the invention, it is now appropriate to summarize the invention to be hereinafter discussed in detail.

SUMMARY OF INVENTION

A first and principle aspect of the invention relates to a supplemental sun shield assembly for a vehicle entailing the following combination concepts.

In this first aspect a supplemental sun shield assembly for a vehicle is contemplated wherein the vehicle provides a headliner and a rear view mirror disposed there below, a windshield projecting generally downward from the headliner, a sun visor, and a sun visor securing fitting for pivotably supporting an end of the sun visor beneath the elevation of the headliner, with the sun visor provides a detent operable to be pivotably supported by the fitting beneath the elevation of the headliner, and a sunlight exposure zone including at least one of a) an exposure zone adjacent to said detent and b) an exposure zone adjacent said sun visor and disposed between said headliner and said rear view mirror.

In this first aspect, the supplemental sun shield assembly comprises:

a sun shield operable to be selectively manipulated between a raised, retracted position and a lowered sun ray impeding position;

the sun shield providing a sun ray impeding barrier operable to be positioned on the vehicle so as to substantially impede the passage of sun rays through the sunlight exposure zone; and a sun shield support operable to movably support the sun shield for sun visor induced movement between the retracted and the sun ray impeding positions.

In further, independently significant aspects, the supplemental sun shield may be characterized by one or more of the following independently significant concepts (separately delineated by letter):

a) the sun shield is supported by the sun shield support so as to be positioned between the windshield and sun visor, the sun shield support includes a resilient biasing means for biasing the sun shield toward the sun visor, and the sun visor is operable to be moved toward the windshield and induce movement of the sun shield from the retracted position to the sun ray impeding position while overcoming the resilient biasing of the resilient biasing means; and/or b) a portion of the sun shield substantially covers the detent; and/or c) a second portion of the sun shield extends along the headliner adjacent at least a portion of the rear view mirror when the sun shield is in the lowered position; and/or d) the sun shield is shaped to lie substantially flush against the sun visor securing fitting and extend along the headliner when in its retracted position; and/or e) the sun shield is supported by the sun shield support so as to be positioned between the headliner and sun visor, the sun shield support includes a resilient biasing means operable to bias the sun shield toward the sun visor, and the sun visor is operable to be moved toward the windshield and induce movement of the sun shield from its retracted position to its sun ray impeding position; and/or f) a portion of the sun shield substantially overlies the detent when in its retracted position; and/or g) the vehicle includes a rear view mirror, and a second portion of the sun shield overlies the headliner adjacent the rear view mirror;

h) the sun shield is shaped to lie substantially flush against the sun visor generally adjacent the headliner when in its retracted position; and/or i) the sun shield extends along the preponderance of the sun visor to impede the passage of sun rays between the headliner and the sun visor; and/or j) the sun shield extends substantially coextensive with the detent substantially along the length of the sun visor to provide an impediment to the passage of sun rays between the headliner and the sun visor; and/or k) the sun shade support is operable to limit the range of motion of the sun shield.

In yet another independently significant aspect this invention entails a supplemental sun shield assembly for a vehicle, with the vehicle providing
a windshield having an upper end,
a headliner connected to the upper end,
a rear view mirror disposed below said headliner, and
a sun visor pivotably mounted with respect to the headliner, with
said sun visor defining at least one sunlight exposure zone including at least one of a) an exposure zone adjacent to said detent and b) an exposure zone adjacent said sun visor and disposed between said headliner and said rear view mirror; and
the supplemental sun shield assembly comprising
a sun shield; and
means for linking the sun shield to the sun visor such that pivoting the visor induces movement of said sun shield over at least the one sunlight exposure zone.

In association with this other independently significant aspect of the invention, one or more further characterizing features may exist including one or more of the following, independently significant and separately lettered concepts:

a) the sun shield is positioned between the windshield and sun visor;
the assembly includes a sun shield support having a resilient biasing means for biasing the sun shield toward the sun visor, and
the sun visor is operable to be moved toward the windshield and induce movement of the sun shield from its retracted position to its sun ray impeding position while overcoming the resilient biasing of the resilient biasing means; and/or b) a first portion of the sun shield substantially covers the linking means; and/or c) a second portion of the sun shield extends along the headliner adjacent at least a portion of the rear view mirror when the sun shield is in its lowered position; and/or d) the sun shield is shaped to lie substantially flush against the linking means and sun visor and adjacent the headliner when in said retracted position; and/or e) the sun shield is positioned between the windshield and sun visor,
the assembly includes a sun shield support having a resilient biasing means operable to bias the sun shield toward the sun visor, and
the sun visor is operable to be moved toward the windshield and induce movement of the sun shield from its retracted position to its sun ray impeding position; and/or f) a first portion of the sun shield assembly substantially overlies the linking means when in its retracted position; and/or g) the vehicle includes a rear view mirror, and
a second portion of the sun shield overlies the headliner adjacent the rear view mirror; and/or h) the sun shield is shaped to lie substantially flush against said sun visor and adjacent the headliner when in said retracted position; and/or i) the sun shield extends along the preponderance of the sun visor to impede the passage of sun rays between the headliner and the sun visor; and/or j) the sun visor includes a detent for pivotably mounting the sun visor to the headliner; and
the sun shield extends substantially coextensive with the detent substantially along the length of the sun visor to provide an impediment to the passage of sun rays between the headliner and the sun visor; and/or k) the linking means is operable to limit the range of motion of the sun shield.

A further major, independently significant, aspect of the invention, resides in a sun visor supplementing sun shield for a vehicle, with the vehicle and sun visor providing
a vehicle headliner disposed above the elevation of the head of a driver of the vehicle,
a vehicle windshield projecting generally downwardly from the headliner in front of the location of the driver,
a sun visor operable to be spaced, at least in part, beneath the elevation of the vehicle headliner,
a sun visor securing fitting operable to pivotably support an end of the sun visor beneath the elevation of the headliner,
a sun visor carried detent operable to be pivotably supported by the fitting beneath the elevation of the headliner, said sun visor including a sunlight exposure zone adjacent to the detent; and the sun shield being operable to shield, from the driver of the vehicle, sun rays passing through the vehicle windshield through the sunlight exposure zone adjacent said detent;

In this further major aspect of the invention, the sun visor supplementing sun shield comprises:

a sun ray passage impeding sun shield operable to be selectively manipulated between
   a raised, retracted position, and
   a sun ray impeding position projecting downwardly from the headliner;

said sun shield providing
   a sun ray impeding barrier operable to be positioned on the vehicle
      a) adjacent the fitting pivotably engaged with said detent, and
      b) substantially covering the sunlight exposure zone adjacent said detent; and
   a sun shield support operable to movably support the sun shield for sun visor induced movement to the sun ray impeding position;
   the sun shield, in its sun ray impeding position, being operable to impede the passage of sun rays through the sunlight exposure zone adjacent the detent.

In a further, combination sense, the invention may be perceived as a sun visor supplementing sun shield and sun visor combination for a vehicle, this combination comprising:

a vehicle providing
   a vehicle headliner disposed above the elevation of the head of a driver of the vehicle, and
   a vehicle windshield projecting generally downwardly from the headliner in front of the location of the driver;

a sun visor operable to be spaced, at least in part, beneath the elevation of the vehicle headliner;

a sun visor securing fitting operable to pivotably support an end of the sun visor beneath the elevation of the headliner;

a sun visor carried detent operable to be pivotably supported by the fitting beneath the elevation of the headliner;

the sun visor including
   a sunlight exposure zone adjacent the detent;

a sun ray passage impeding sun shield operable to be selectively manipulated between
   a raised, retracted position, and
   a sun ray impeding position projecting downwardly from the headliner;

this sun shield being operable to shield, from the driver of the vehicle, sun rays passing through the vehicle windshield and through the sunlight exposure zone adjacent the detent;

the sun shield providing
   a sun ray impeding barrier operable to be positioned on the vehicle
      a) adjacent the fitting pivotably engaged with said detent, and
      b) substantially covering the sunlight exposure zone adjacent the detent; and
   a sun shield support operable to movably support the sun shield for sun visor induced movement to the sun ray impeding position;
   the sun shield, in its sun impeding position, being operable to impede the passage of sun rays through the sunlight exposure zone adjacent the detent.

In a method sense, this invention contemplates a method for providing and deploying a sun visor supplementing sun shield and sun visor combination for a vehicle, the method comprising the following steps (not confined to the sequence of recitation):

providing a vehicle having
   a vehicle headliner disposed above the elevation of the head of a driver of the vehicle, and
   a vehicle windshield projecting generally downwardly from the headliner in front of the location of the driver;

providing a sun visor operable to be spaced, at least in part, beneath the elevation of the vehicle headliner;

providing a sun visor securing fitting operable to pivotably support an end of the sun visor beneath the elevation of the headliner;

providing a sun visor carried detent operable to be pivotably supported by the fitting beneath the elevation of the headliner;

the sun visor defining
   a sunlight exposure zone adjacent said detent;

providing a sun ray passage impeding sun shield operable to be selectively manipulated between
   a raised, retracted position, and
   a sun ray impeding position projecting downwardly from the headliner;

the sun shield being operable to shield, from the driver of the vehicle, sun rays passing through the vehicle windshield through the sunlight exposure zone adjacent the detent;

this sun shield providing
   a sun ray impeding barrier operable to be positioned on the vehicle
      a) adjacent said fitting pivotably engaged with the detent, and
      b) substantially covering the sunlight exposure zone adjacent the detent; and providing a sun shield support operable to movably support the sun shield for sun visor induced movement to the sun ray impeding position;
   the sun shield, in its sun impeding position, being operable to impede the passage of sun rays through the sunlight exposure zone adjacent the detent.

With the invention thus having been summarized, it is now appropriate to consider detailed aspects of the invention which are illustrated in the appended drawings.

DRAWINGS

In the drawings:

FIG. 1 provides an elevational view of one form of a sun visor and supplemental sun shield embodiment of the present invention characterized by a supplemental sun shield which is resiliently mounted in association with the sun visor and continuously biased toward the sun visor so as to provide continuously effective supplemental sun shielding action, with FIG. 1 being a view facing from the driver's position looking forward through the vehicle windshield;

FIG. 2 provides a side elevational view of the FIG. 2 assembly, illustrating the sun shield of FIG. 1 in a retracted or raised position;

FIG. 3 is a schematic view of the FIG. 1 assembly illustrating the sun visor and supplemental sun shield in a lowered position, with the resiliently biased supplemental sun shield effectively blocking the sun rays from passing through a sun light exposure zone adjacent to and beneath a pivot supporting detent connecting the sun visor to a mounting fitting secured to the vehicle headliner area;

FIG. 4 schematically illustrates, in elevational format, the FIG. 1 assembly with the sun visor pivoted fully forward so that its lower portion is substantially contiguous with the sun shield, with the spring biased supplemental sun shield continuing to provide effective sun blocking action with respect to the sun light exposure zone adjacent to the sun visor detent; and FIG. 5 illustrates the alternative embodiment of the invention characterized by supplemental sun shield configurations of varying shape which may be detachably mounted upon the face of a conventional sun visor without interfering with sun visor action, with the supplemental sun shield continuously providing sun blocking action automatically in relation to the aforesaid sun light exposure zone adjacent to the sun visor detent, regardless of the position of the sun visor.

Having summarized the drawings, it is now appropriate to present a detailed discussion of the inventive concept of this disclosure.

PRESENTLY PREFERRED EMBODIMENTS

In describing the presently preferred embodiments, a detailed description will first be presented with respect to the application drawings. Thereafter, the invention will be summarized in its various, independently significant formats or aspects.

Detailed Description

Figure 1:
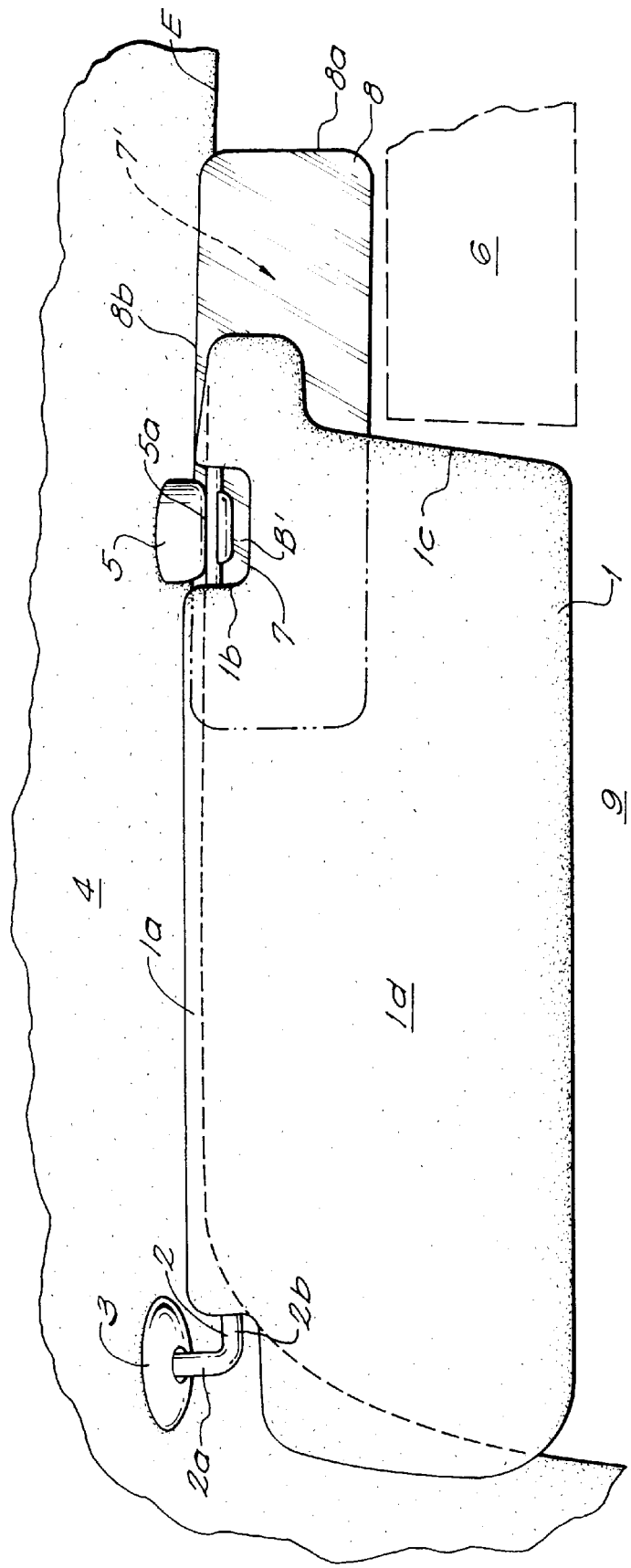

As shown in FIG. 1, a conventional sun visor 1 is pivotably mounted upon an L-shaped arm 2. Arm 2 is supported by a bracket 3 depending from a vehicle headliner area 4. Support arm 2 includes a downwardly projecting portion 2a which is pivotably about a generally vertical axis. L-shaped arm 2 also provides a generally horizontally extending portion 2b which is journaled within the upper end 1a of the sun visor so as to permit the upper end 1a of the sun visor to pivot about a generally horizontal axis.

A vehicle headliner supported fitting 5 depends downwardly from the headliner 4 and includes a detent engagable recess 5a. A rod like detent 1b, carried by the sun visor, is detachably engagable with the recess area 5a of the fitting so as to securely support the end 1c of the sun visor adjacent to a rear view mirror containing area 6 (the conventional mirror 6 not being illustrated in detail, its area of location only being shown).

The mounting detent 1b is at times associated with a recess area 7 in order to facilitate a vehicle operator's engagement of the detent 1b with the fitting recess 5a. In this arrangement there is provided a sunlight exposure zone including at least one of a) the opening 7 which defines a potential exposure zone which is adjacent to and normally beneath the detent 1b when the sun visor is disposed in the lowered or operable position shown in FIG. 1 and b) the exposure zone 7' adjacent the sun visor 1 and disposed between the headliner 4 and the rear view mirror 6.

As shown in FIG. 1, a supplemental sun shield 8 is associated with the sun visor 1. As shown in these FIGURES, supplemental sun shield 8 is mounted so as to be engagable with the outer face 1d of the sun visor 1, i.e., it is positioned between the sun visor 1 and the vehicle periphery area defined by the headliner 4 and a vehicle windshield W.

Figure 2:
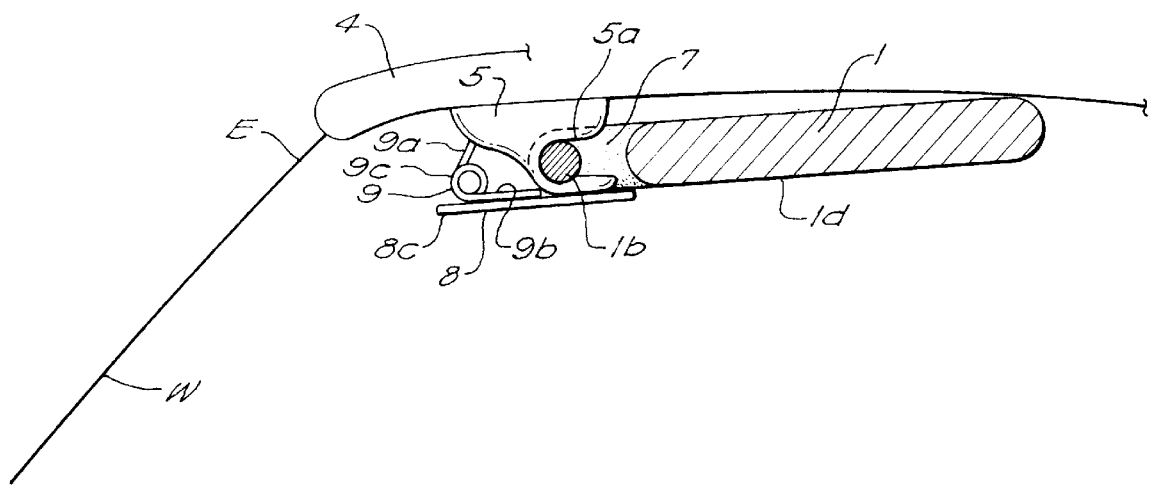
Figure 3:
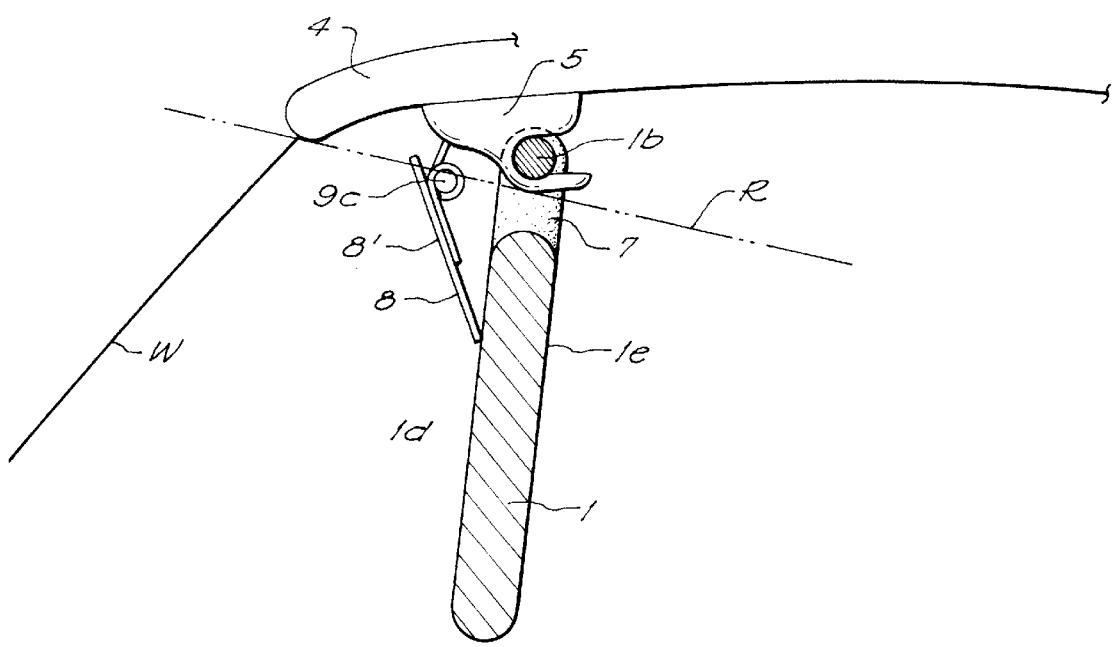

The manner in which the supplemental sun shield 8 is mounted in relation to the sun visor 1 is clarified in FIGS. 2 through 4.

As shown in these FIGURES, a torsion spring 9 is employed as one means for linking the shield 8 to sun visor 1, i.e., supporting the shield 8 for sun visor 1 induced movement. Spring linkage 9 has a torsion spring leg 9a embedded in or otherwise fastened to the fitting 5. The other free leg or end 9b of the torsion spring 9 is fixed to or secured to the supplemental sun visor 8 by any conventional fastening means. The coiled core 9c of the torsion spring 9 is configured so as to induce a resilient convergence of the legs 9a and 9b. With this resilient converging tendency of the legs 9a and 9b, the mounting spring 9 will resiliently urge the supplemental sun shield 8 against the outer most sun visor face 1d, i.e., the sun visor face which would be disposed facing outwardly of the vehicle when the sun visor is disposed in the lowered position of FIG. 3, with the operator thus looking directly at the interior sun visor face 1e.

As shown in FIG. 2, in the retracted or elevated position of the sun visor 1, the supplemental sun shield is disposed in an automatically retracted position, lying essentially along the underside of the elevated sun visor, i.e., lying generally longitudinally of and adjacent the headliner 4, covering the linkage 9, detent 1b, and recess 7.

When an operator engages the sun visor 1 to move it to the lowered or sun ray impeding position of FIG. 3, the downward pivoting action of the sun visor will automatically cause the supplemental sun shield to rotate downwardly about the biasing spring core 9c so as to move to the lowered, sun ray blocking position of FIG. 3. In this position, the supplemental sun shield provides a barrier portion $B^1$ of shield 8 which effectively blocks the passage of sun rays going through the zone 7 from the upper portion or end E of the windshield W, in the area generally at the juncture of the windshield 9 and the headliner 4. These sun rays are schematically depicted in FIG. 3 by the reference character R. As thus shown in FIG. 3, the downwardly rotated position of the sun shield 8, automatically effected by the resilient mounting spring 9, brings the supplemental sun shield into an operable position where it is effective to block the passage of sun rays through the exposure zones 7 and/or 7'. (Moreover, even in the retracted position of FIG. 2, the sun shield provides a barrier to sun ray transmission at the leading edge 1a of the sun visor 1.)

Even when the sun visor is pushed fully forward as shown in FIG. 4, to be positioned with its lower portion 1f substantially adjacent the windshield W, the automatically effective action of the mounting spring 9 serves to permit the sun visor to be manipulated to this forward position without interference, but with the supplemental sun shield 8 remaining effective to continue to block the passage of the sun rays R through the sunlight exposure zone 7 which is adjacent to the sun visor mounting detent 1.

This blocking action of barrier $B^1$ is particularly effective in reducing the annoying transmittal of sun rays through the sunlight exposure zone 7.

As shown in FIG. 1, the supplemental sun shield also may be provided with an extension area 8a extending laterally of the sun visor 1 toward the rear view mirror area 6 so as to provide further sun ray impeding action laterally of the sun visor. In addition, the upper end 8b of the supplemental sun shield may be extended so as to provide a portion of the sun shield lying above the upper edge 1a of the sun visor and overlying the headliner 4, with the supplemental sun shield 8 further possibly being extending to the left as shown in FIG. 1 to provide supplemental sun shielding action above the sun visor 1 along the entire length of the upper edge 1a of the sun visor. (Such an arrangement could correspond, for example, to the enlarged shield 11a shown in phantom line configuration in FIG. 5.) As shown 8a/8b portions effectively block sun rays from passing through exposure zone 7'.

While the supplemental sun shielding action provided by the FIG. 1–4 embodiment is particularly efficacious and efficient, in certain instances a simplified form of the invention may be employed, as illustrated in FIG. 5.

FIG. 5 illustrates the invention employed in the context of a somewhat differently configured sun visor 10 with the supplemental sun shield comprising a plate or web like member 11 which is preferably secured to the inner face 11e of the sun visor by detachable fastening means such as the schematically illustrated velcro or detachable adhesive bonding area 12. The supplemental sun shield 11 as shown in FIG. 4 provides a barrier portion $B^2$ which effectively covers the sunlight exposure area 13 which is beneath and adjacent to the sun visor mounting detent 1b, i.e., a detent the same as that contemplated in connection with the FIG. 1 embodiment. In this connection it is to be observed that the FIG. 5 embodiment is presented in the context of a sun visor mounting fitting 5 which is the same as that heretofore described in connection with the FIG. 1 embodiment.

The simplicity of the mounting arrangement shown in the FIG. 5 embodiment ensures that the sunlight exposure zone 13 of the sun visor is continuously prevented by the supplemental sun shield 11 from transmitting sun rays to the eyes of the vehicle operator, with the supplemental sun shield being continuously effectively positioned without in any way interfering with the normal pivoting and positioning action of the sun shield 10 itself.

As shown by the phantom line configuration 11a of FIG. 5, the supplemental sun shield 11 may be extended both laterally and vertically so as to provide extended portions lying above the upper edge of the sun visor and to the right side of the sun visor depicted in FIG. 5, projecting toward the rear view mirror mounting area 6. With such an extended configuration, the supplemental sun shield 11 would provide supplemental sun shielding action both above and laterally of the sun shield and overlapping the headliner. Thus, shield 11, manipulated by sun visor 10, would continue to uniquely block the transmittal of irritating sun rays through the sunlight exposure zone 13 adjacent to the sun visor mounting detent 1b and would also block the transmittal of such sun rays through exposure zone 13'.

Supplemental sun shields 8 and 11 may be fabricated of plate, web, or sheet defining material such as plastic, metal, paper, cardboard, wood, fabric, etc. Shields 8 and 11 may be non-transparent, opaque or even partially light transmissions in areas where sun blocking or impeding is not desired. Shields 8 and 11 may be mounted on either the front or rear faces of their associated sun visors, depending upon the support and mounting arrangements employed, etc.

As will also be appreciated, each of support/linkage mechanism 9 and support/linkage mechanism 12 will inherently define a linkage or support which defines limited freedom of movement for their associated sun shields, this limited motion being defined by the motion limitation of the sun shield associated with sun visor.

In addition, in each instance, the sun shield serves to effectively cover or overlie its associated mounting or linkage means in relation to the vehicle operator position.

Overview of Inventive Aspects

With the invention having been described in detail both as the structure and mode of operation, it is now appropriate to overview significantly aspects of the invention in the context of the detailed description heretofore set forth.

At the outset, it is to be recognized that the invention entails a supplemental sun shield assembly for a vehicle with the vehicle providing:

a headliner 4 and a rear view mirror 6 disposed there below, a windshield W projecting generally downward from the headliner, a sun visor 1 or 10, and a sun visor securing fitting 5 for pivotably supporting an end of the sun visor beneath the elevation of the headliner 4, with the sun visor 1 or 10 provides a detent 1b operable to be pivotally supported by the fitting S beneath the elevation of the headliner 4, and a sunlight exposure zone including at least one of a) the exposure zone 7 or 13 adjacent to the detent 1b and b) the exposure zone 7' or 13' adjacent to the sun visor and disposed between the headliner 4 and the rear view mirror 6.

In this first aspect, the supplemental sun shield assembly comprises:

a sun shield 8 or 11 operable to be selectively manipulated between a raised, retracted position and a lowered sun ray impeding position;

the sun shield 8 or 11 providing at least one of a) a sun ray impeding barrier $B^1$ or $B^2$ operable to be positioned on the vehicle so as to substantially impede the passage of sun rays through at least one of a) the exposure zone 7 or 13 and b) a barrier 8a/8b or 11a blocking the exposure zone 7' or 13'; and a sun shield support 9 or 12 operable to movably support the sun shield 8 or 11 for sun visor induced movement between the retracted and the sun ray impeding positions.

In further, independently significant aspects, the supplemental sun shield may be characterized by one or more of the following individual and separately lettered concepts:

a) the sun shield 8 is supported by the sun shield support 9 so as to be positioned between the windshield W and sun visor, the sun shield support 9 includes a resilient biasing means 9c for biasing the sun shield 8 toward the sun visor 1, and the sun visor 1 is operable to be moved toward the windshield W and induce movement of the sun shield 8 from the retracted position to the sun ray impeding position while overcoming the resilient biasing of the resilient biasing means 9c; and/or b) a portion of the sun shield 8 or 11 substantially covers the detent 1b; and/or c) a second portion 8a or 11a of the sun shield extends along the headliner adjacent at least a portion of the rear view mirror when the sun shield is in the retracted position; and/or d) the sun shield 8 or 11 is shaped to lie substantially flush against the sun visor securing fitting 5 and extend along the headliner when in its retracted position; and/or e) the sun shield 8 is supported by the sun shield support so as to be positioned between the headliner 4 and sun visor 1, the sun shield support 9 includes a resilient biasing means 9c operable to bias the sun shield 8 toward the sun visor 1, and the sun visor 1 is operable to be moved toward the windshield W and induce movement of the sun shield 8 from its retracted position to its sun ray impeding position; and/or f) a portion of the sun shield 8 or 11 substantially overlies the detent 1b when in its retracted position; and/or g) the vehicle includes a rear view mirror 6, and a second portion 8a, 8b, or 11a of the sun shield overlies the headliner adjacent the rear view mirror; and/or h) the sun shield 8 or 11 is shaped to lie substantially flush against the sun visor 1 or 10 generally adjacent the headliner 4 when in its retracted position; and/or i) the sun shield 8 (extended vertically and laterally as described) or 11a extends along the preponderance of the sun visor to impede the passage of sun rays between the headliner 4 and the sun visor 1 or 10; and/or j) the sun shield 8 (extended vertically and laterally as described) or 11a extends substantially coextensive with the detent 1b and substantially along the length of the sun visor 1 or 10 to provide an impediment to the passage of sun rays between the headliner 4 and the sun visor 1 or 10; and/or k) the sun shield support 9 or 12 is operable to limit the range of motion of the sun shield.

As earlier noted, in yet another independently significant aspect, this invention entails a supplemental sun shield assembly for a vehicle, with the vehicle providing
a windshield W having an upper end E,
a headliner 4 connected to the upper end E,
a rear view mirror 6 disposed below the headliner 4, and
a sun visor 1 or 10 pivotably mounted with respect to the headliner 4, with
the sun visor 1 or 10 defining at least one sunlight exposure zone including at least one of exposure zone 7 or 13, and exposure zone 7' or 13'; and the supplemental sun shield assembly comprising
a sun shield 8 or 11; and
means 9 or 12 for linking the sun shield to the sun visor 1 or 10 such that pivoting the visor 1 or 10 induces movement of the sun shield 8 or 11 over at least the one sunlight exposure zone 7 or 13.

As was also earlier noted, in association with this other independently significant aspect of the invention, one or more individually significant and further characterizing features may exist, including one or more of the following separately lettered concepts:

a) the sun shield 8 is positioned between the windshield W and sun visor 1,
the assembly includes a sun shield 8 support having a resilient biasing means 9c for biasing the sun shield 8 toward the sun visor 1, and
the sun visor 1 is operable to be moved toward the windshield W and induce movement of the sun shield 8 from its retracted position to its sun ray impeding position while overcoming the resilient biasing of the resilient biasing means 9c; and/or b) a first portion 8c (FIG. 2) or 11c (FIG. 4) of the sun shield 8 or 11 substantially covers the linking means 9 or 12; and/or c) a second portion 8a, 8b or 11a of the sun shield extends along the headliner 4 adjacent at least a portion of the rear view mirror 6 when the sun shield is in its retracted position; and/or d) the sun shield 8 or 11 is shaped to lie substantially flush against the linking means 9 or 12 and sun visor 1 or 10 and adjacent the headliner 4 when in the sun shield retracted position; and/or e) the sun shield 8 is positioned between the windshield W and sun visor 1,
the assembly includes a sun shield support 9 having a resilient biasing means 9c operable to bias the sun shield 8 toward the sun visor 1, and the sun visor 1 is operable to be moved toward the windshield W and induce movement of the sun shield 8 from its retracted position to its sun ray impeding position; and/or f) a first portion 8c or 11c of the sun shield assembly substantially overlies the linking means 9 or 12 when in its retracted position; and/or g) the vehicle includes a rear view mirror 6, and
a second portion 8a, 8b or 11a of the sun shield overlies the headliner 4 adjacent the rear view mirror 6; and/or h) the sun shield 8 or 11 is shaped to lie substantially flush against said sun visor 1 or 10 and adjacent the headliner 4 when in said retracted position; and/or i) the sun shield 8 (extended as described) or 11a extends along the preponderance of the sun visor 1 or 10 to impede the passage of sun rays between the headliner 4 and the sun visor 1 or 10; and/or j) the sun visor 1 or 10 includes a detent 1b for pivotably mounting the sun visor 1 or 12 to the headliner 4, and
the sun shield 8 (extended as described) or 11a extends substantially coextensive with the detent 1b and substantially along the length of the sun visor 1 or 10 to provide an impediment to the passage of sun rays between the headliner 4 and the sun visor 1 or 10; and/or k) the linking means 9 or 12 is operable to limit the range of motion of the sun shield 8 or 11.

A further major, independently significant aspect of the invention, resides in a sun visor supplementing sun shield for a vehicle, with the vehicle and sun visor providing
a vehicle headliner 4 disposed above the elevation of the head of a driver of the vehicle,
a vehicle windshield W projecting generally downwardly from the headliner 4 in front of the location of the driver,
a sun visor 1 or 10 operable to be spaced, at least in part, beneath the elevation of the vehicle headliner 4,
a sun visor securing fitting 5 operable to pivotably support an end of the sun visor 1 or 10 beneath the elevation of the headliner 4,
a sun visor carried detent 1b operable to be pivotably supported by the fitting 5 beneath the elevation of the headliner 4, said sun visor 1 or 10 including
a sunlight exposure zone 7 or 13 adjacent to the detent 1b; and the sun shield 8 or 11 being operable to shield, from the driver of the vehicle, sun rays passing through the vehicle windshield W through the sunlight exposure zone 7 or 13 adjacent said detent.

In this further major aspect of the invention, the sun visor supplementing sun shield comprises:

a sun ray passage impeding sun shield 8 or 11 operable to be selectively manipulated between
a raised, retracted position, and
a sun ray impeding position projecting downwardly from the headliner 4;

said sun shield 8 or 11 providing
a sun ray impeding barrier $B^1$ (FIG. 1) or $B^2$ (FIG. 4) operable to be positioned on the vehicle
a) adjacent the fitting 5 pivotably engaged with said detent 1b, and
b) substantially covering the sunlight exposure zone 7 or 13 adjacent said detent 1b; and a sun shield support 9 or 12 operable to movably support the sun shield for sun visor induced movement to the sun ray impeding position;

the sun shield 8 or 11, in its sun ray impeding position, being operable to impede the passage of sun rays through the sunlight exposure zone 7 or 13 adjacent the detent 1b.

In a combination sense, the invention may be perceived as a sun visor supplementing sun shield and sun visor combination for a vehicle, this combination comprising:

a vehicle providing
    a vehicle headliner 4 disposed above the elevation of the head of a driver of the vehicle, and
    a vehicle windshield W projecting generally downwardly from the headliner 4 in front of the location of the driver;

a sun visor 1 or 10 operable to be spaced, at least in part, beneath the elevation of the vehicle headliner 4;

a sun visor securing fitting 5 operable to pivotably support an end of the sun visor 1 or 10 beneath the elevation of the headliner 4;

a sun visor carried detent 1b operable to be pivotably supported by the fitting 5 beneath the elevation of the headliner 4;

the sun visor 1 or 10 including
    a sunlight exposure zone 7 or 13 adjacent the detent;

a sun ray passage impeding sun shield 8 or 11 operable to be selectively manipulated between
    a raised, retracted position, and
    a sun ray impeding position projecting downwardly from the headliner;

this sun shield 8 or 11 being operable to shield, from the driver of the vehicle, sun rays passing through the vehicle windshield W and through the sunlight exposure zone 7 or 13 adjacent the detent 1b;

the sun shield 8 or 11 providing
    a sun ray impeding barrier $B^1$ or $B^2$ operable to be positioned on the vehicle
        a) adjacent the fitting 5 pivotably engaged with said detent 1b, and
        b) substantially covering the sunlight exposure zone 7 or 13 adjacent the detent 1b; and a sun shield support 9 or 12 operable to movably support the sun shield 8 or 11 for sun visor induced movement to the sun ray impeding position;

the sun shield 8 or 11, in its sun impeding position, being operable to impede the passage of sun rays through the sunlight exposure zone 7 or 13 adjacent the detent.

In a method sense, this invention contemplates a method for providing and deploying a sun visor supplementing sun shield and sun visor combination for a vehicle, the method comprising the following steps (not confined to the sequence of recitation):

providing a vehicle having
    a vehicle headliner 4 disposed above the elevation of the head of a driver of the vehicle, and
    a vehicle windshield W projecting generally downwardly from the headliner 4 in front of the location of the driver;

providing a sun visor 1 or 10 operable to be spaced, at least in part, beneath the elevation of the vehicle headliner 4;

providing a sun visor securing fitting 5 operable to pivotably support an end of the sun visor 1 or 10 beneath the elevation of the headliner;

providing a sun visor carried detent 1b operable to be pivotably supported by the fitting 5 beneath the elevation of the headliner 4;

the sun visor 1 or 10 defining
    a sunlight exposure zone 7 or 13 adjacent said detent 1b;

providing a sun ray passage impeding sun shield 8 or 11 operable to be selectively manipulated between
    a raised, retracted position, and
    a sun ray impeding position projecting downwardly from the headliner;

the sun shield 8 or 11 being operable to shield, from the driver of the vehicle, sun rays passing through the vehicle windshield W through the sunlight exposure zone 7 or 13 adjacent the detent 1b;

this sun shield 8 or 11 providing
    a sun ray impeding barrier $B^1$ or $B^2$ operable to be positioned on the vehicle
        a) adjacent said fitting 5 pivotably engaged with the detent 1b, and
        b) substantially covering the sunlight exposure zone 7 or 13 adjacent the detent 1b; and providing a sun shield support 9 or 12 operable to movably support the sun shield 8 or 11 for sun visor induced movement to the sun ray impeding position;

the sun shield, in its sun ray impeding position, being operable to impede the passage of sun rays through the sunlight exposure zone 7 or 13 adjacent the detent 1b.

At this juncture, with presently preferred embodiments having been illustrated, described in detail, and summarized, it is appropriate to overview advantages, non-obviousness, and scope aspects of the invention.

SUMMARY OF ADVANTAGES AND ASPECTS AND SCOPE OF INVENTION

The supplemental sun shield concept to the present invention provides a unique cure for the irritating problems associated with the transmittal of sun rays through a sunlight exposure zone of a vehicle sun visor.

This effective enhancement of sun ray blocking action is achieved without interfering with the normal operation of a sun visor. Moreover, the sunlight exposure zone which includes at least one of a) an exposure zone adjacent to the mounting detent of a sun visor and b) an exposure zone disposed adjacent the sun visor and between the headliner and rear view mirror, is continuously effectively covered or blocked with respect to sunlight transmission, regardless of the position of the sun visor itself.

As has been shown, with any embodiment of the invention, manipulation of the sun visor from a raised or retracted configuration to a lowered or operable position, or to a forward position contiguous to the windshield, is able to be effected in a normal manner without interference with normal sun visor action.

The general state of the prior art, as exemplified at the outset of this disclosure, fails to suggest this unique concept and thereby evidences the non-obviousness of the present invention.

Those skilled in the vehicle sun visor art and familiar with the disclosure of the invention may well recognize additions, deletions, substitutions, equivalent arrangements or other modifications, all of which would be deemed to fall within the purview of the invention as set forth in the appended claims.

What is claimed is:

1. A supplemental sun shield assembly for a vehicle,
said vehicle providing
   a headliner and a rear view mirror disposed there below,
   a windshield projecting generally downward from said headliner,
   a sun visor, and
   a sun visor securing fitting for pivotably supporting an end of said sun visor beneath the elevation of said headliner,
   said sun visor providing
      a detent operable to be pivotably supported by said fitting beneath the elevation of said headliner, and
      a sunlight exposure zone including at least one of a) an exposure zone adjacent to said detent and b) an exposure zone adjacent said sun visor and disposed between said headliner and said rear view mirror;
   said supplemental sun shield assembly comprising:
      a sun shield operable to be selectively manipulated between a raised retracted position and a lowered sun ray impeding position;
      said sun shield providing a sun ray impeding barrier operable to be positioned on said vehicle so as to substantially impede the passage of sun rays through said sunlight exposure zone; and
      a sun shield support operable to movably support said sun shield for sun visor induced movement between said retracted and said sun ray impeding positions.

2. A supplemental sun shield assembly as provided in claim 1, wherein
   said sun shield is supported by said sun shield support so as to be positioned between said windshield and sun visor,
   said sun shield support includes a resilient biasing means for biasing said sun shield toward said sun visor, and
   said sun visor is operable to be moved toward said windshield and induce movement of said sun shield from said retracted position to said sun ray impeding position while overcoming the resilient biasing of said resilient biasing means.

3. A supplemental sun shield assembly as provided in claim 2, wherein
   a portion of said sun shield substantially covers said detent.

4. A supplemental sun shield assembly as provided in claim 3, wherein
   a second portion of said sun shield extends along said headliner adjacent at least a portion of said rear view mirror when said sun shield is in said lowered position.

5. A supplemental sun shield assembly as provided in claim 4, wherein
   said sun shield is shaped to lie substantially flush against said sun visor securing fitting and extend along the headliner when in said retracted position.

6. A supplemental sun shield assembly as provided in claim 1, wherein
   said sun shield is supported by said sun shield support so as to be positioned between said headliner and sun visor,
   said sun shield support includes a resilient biasing means operable to bias said sun shield toward said sun visor, and
   said sun visor is operable to be moved toward said windshield and induce movement of said sun shield from said retracted position to said sun ray impeding position.

7. A supplemental sun shield assembly as provided in claim 6, wherein
   a portion of said sun shield substantially overlies said detent when in said retracted position.

8. A supplemental sun shield assembly as provided in claim 7, wherein
   said vehicle includes a rear view mirror, and a second portion of said sun shield overlies said headliner adjacent said rear view mirror.

9. A supplemental sun shield assembly as provided in claim 8, wherein
   said sun shield is shaped to lie substantially flush against said sun visor generally adjacent the headliner when in said retracted position.

10. A supplemental sun shield assembly as provided in claim 1, wherein
    said sun shield extends along the preponderance of said sun visor to impede the passage of sun rays between said headliner and said sun visor.

11. A supplemental sun shield assembly as provided in claim 1, wherein
    said sun shield extends substantially coextensive with said detent and substantially along the length of said sun visor to provide an impediment to the passage of sun rays between said headliner and said sun visor.

12. A supplemental sun shield assembly as provided in claim 2, wherein
    said sun shade support is operable to limit the range of motion of said sun shield.

13. A supplemental sun shield assembly for a vehicle,
said vehicle providing
   a windshield having an upper end,
   a headliner connected to said upper end,
   a rear view mirror disposed below said headliner, and
   a sun visor pivotably mounted with respect to said headliner,
   said sun visor providing at least one sunlight exposure zone including at least one of a) an exposure zone adjacent to said detent and b) an exposure zone adjacent said sun visor and disposed between said headliner and said rear view mirror;
   said supplemental sun shield assembly comprising:
      a sun shield; and
      means for linking said sun shield to said sun visor such that pivoting said visor induces movement of said sun shield over said at least one sunlight exposure zone.

14. A supplemental sun shield assembly as provided in claim 13, wherein
    said sun shield is positioned between said windshield and sun visor,
    said assembly includes a sun shield support having a resilient biasing means for biasing said sun shield toward said sun visor,
    said sun visor being operable to be moved toward said windshield and induce movement of said sun shield from said retracted position to said sun ray impeding position while overcoming the resilient biasing of said resilient biasing means.

15. A supplemental sun shield assembly as provided in claim 14, wherein
    a first portion of said sun shield substantially covers said linking means.

16. A supplemental sun shield assembly as provided in claim 15, wherein a second portion of said sun shield extends along said headliner adjacent at least a portion of said rear view mirror when said sun shield is in said lowered position.

17. A supplemental sun shield assembly as provided in claim 16, wherein
    said sun shield is shaped to lie substantially flush against said linking means and sun visor and adjacent the headliner when in said retracted position.

18. A supplemental sun shield assembly as provided in claim 13, wherein
    said sun shield is positioned between said windshield and sun visor,
    said assembly includes a sun shield support having a resilient biasing means operable to bias said sun shield toward said sun visor, and
    said sun visor is operable to be moved toward said windshield and induce movement of said sun shield from said retracted position to said sun ray impeding position.

19. A supplemental sun shield assembly as provided in claim 18, wherein
    a first portion of said sun shield assembly substantially overlies said linking means when in said retracted position.

20. A supplemental sun shield assembly as provided in claim 19, wherein
    said vehicle includes a rear view mirror, and
    a second portion of said sun shield overlies said headliner adjacent said rear view mirror.

21. A supplemental sun shield assembly as provided in claim 20, wherein
    said sun shield is shaped to lie substantially flush against said sun visor and adjacent the headliner when in said retracted position.

22. A supplemental sun shield assembly as provided in claim 13, wherein
    said sun shield extends along the preponderance of said sun visor to impede the passage of sun rays between said headliner and said sun visor.

23. A supplemental sun shield assembly as provided in claim 13, wherein
    said sun visor includes a detent for pivotably mounting said sun visor to said headliner, and
    said sun shield extends substantially coextensive with said detent and substantially along the length of said sun visor to provide an impediment to the passage of sun rays between said headliner and said sun visor.

24. A supplemental sun shield assembly as provided in claim 14, wherein
    said linking means is operable to limit the range of motion of said sun shield.

25. A sun visor supplementing sun shield for a vehicle, with
    said vehicle and sun visor providing
        a vehicle headliner disposed above the elevation of the head of a driver of said vehicle,
        a vehicle windshield projecting generally downwardly from said headliner in front of the location of said driver,
        a sun visor operable to be spaced, at least in part, beneath the elevation of said vehicle headliner,
        a sun visor securing fitting operable to pivotably support an end of said sun visor beneath the elevation of said headliner,
        a sun visor carried detent operable to be pivotably supported by said fitting beneath the elevation of said headliner, said sun visor including
            a sunlight exposure zone adjacent to said detent; and
    said sun shield being operable to shield, from said driver of the vehicle, sun rays passing through the vehicle windshield through said sunlight exposure zone adjacent said detent;
    said sun visor supplementing sun shield comprising:
        a sun ray passage impeding sun shield operable to be selectively manipulated between
            a raised, retracted position, and
            a sun ray impeding position projecting downwardly from said headliner;
        said sun shield providing
            a sun ray impeding barrier operable to be positioned on said vehicle
                a) adjacent said fitting pivotably engaged with said detent, and
                b) substantially covering said sunlight exposure zone adjacent said detent; and
        a sun shield support operable to movably support said sun shield for sun visor induced movement to said sun ray impeding position;
        said sun shield, in said sun ray impeding position, being operable to impede the passage of sun rays through said sunlight exposure zone adjacent said detent.

26. A sun visor supplementing sun shield and sun visor combination for a vehicle comprising:
    a vehicle providing
        a vehicle headliner disposed above the elevation of the head of a driver of said vehicle, and
        a vehicle windshield projecting generally downwardly from said headliner in front of the location of said driver;
    a sun visor operable to be spaced, at least in part, beneath the elevation of said vehicle headliner;
    a sun visor securing fitting operable to pivotably support an end of said sun visor beneath the elevation of said headliner;
    a sun visor carried detent operable to be pivotably supported by said fitting beneath the elevation of said headliner;
    said sun visor including
        a sunlight exposure zone adjacent said detent;
    a sun ray passage impeding sun shield operable to be selectively manipulated between
        a raised, retracted position, and
        a sun ray impeding position projecting downwardly from said headliner;
    said sun shield being operable to shield, from said driver of the vehicle, sun rays passing through the vehicle windshield and through said sunlight exposure zone adjacent said detent;
    said sun shield providing
        a sun ray impeding barrier operable to be positioned on said vehicle
            a) adjacent said fitting pivotably engaged with said detent, and
            b) substantially covering said sunlight exposure zone adjacent said detent; and
    a sun shield support operable to movably support said sun shield for sun visor induced movement to said sun ray impeding position;
    said sun shield, in said sun impeding position, being operable to impede the passage of sun rays through said sunlight exposure zone adjacent said detent.

27. A method for providing and deploying a sun visor supplementing sun shield and sun visor combination for a vehicle, said method comprising the following steps not confined to the sequence of recitation:

providing a vehicle having
- a vehicle headliner disposed above the elevation of the head of a driver of said vehicle, and
- a vehicle windshield projecting generally downwardly from said headliner in front of the location of said driver;

providing a sun visor operable to be spaced, at least in part, beneath the elevation of said vehicle headliner;

providing a sun visor securing fitting operable to pivotably support an end of said sun visor beneath the elevation of said headliner;

providing a sun visor carried detent operable to be pivotably supported by said fitting beneath the elevation of said headliner;

said sun visor defining
- a sunlight exposure zone adjacent said detent;

providing a sun ray passage impeding sun shield operable to be selectively manipulated between
- a raised, retracted position, and
- a sun ray impeding position projecting downwardly from said headliner;

said sun shield being operable to shield, from said driver of the vehicle, sun rays passing through the vehicle windshield through said sunlight exposure zone adjacent said detent;

said sun shield providing
- a sun ray impeding barrier operable to be positioned on said vehicle
  - a) adjacent said fitting pivotably engaged with said detent, and
  - b) substantially covering said sunlight exposure zone adjacent said detent; and providing a sun shield support operable to movably support said sun shield for sun visor induced movement to said sun ray impeding position;

said sun shield, in said sun impeding position, being operable to impede the passage of sun rays through said sunlight exposure zone adjacent said detent.

* * * * *